UNITED STATES PATENT OFFICE

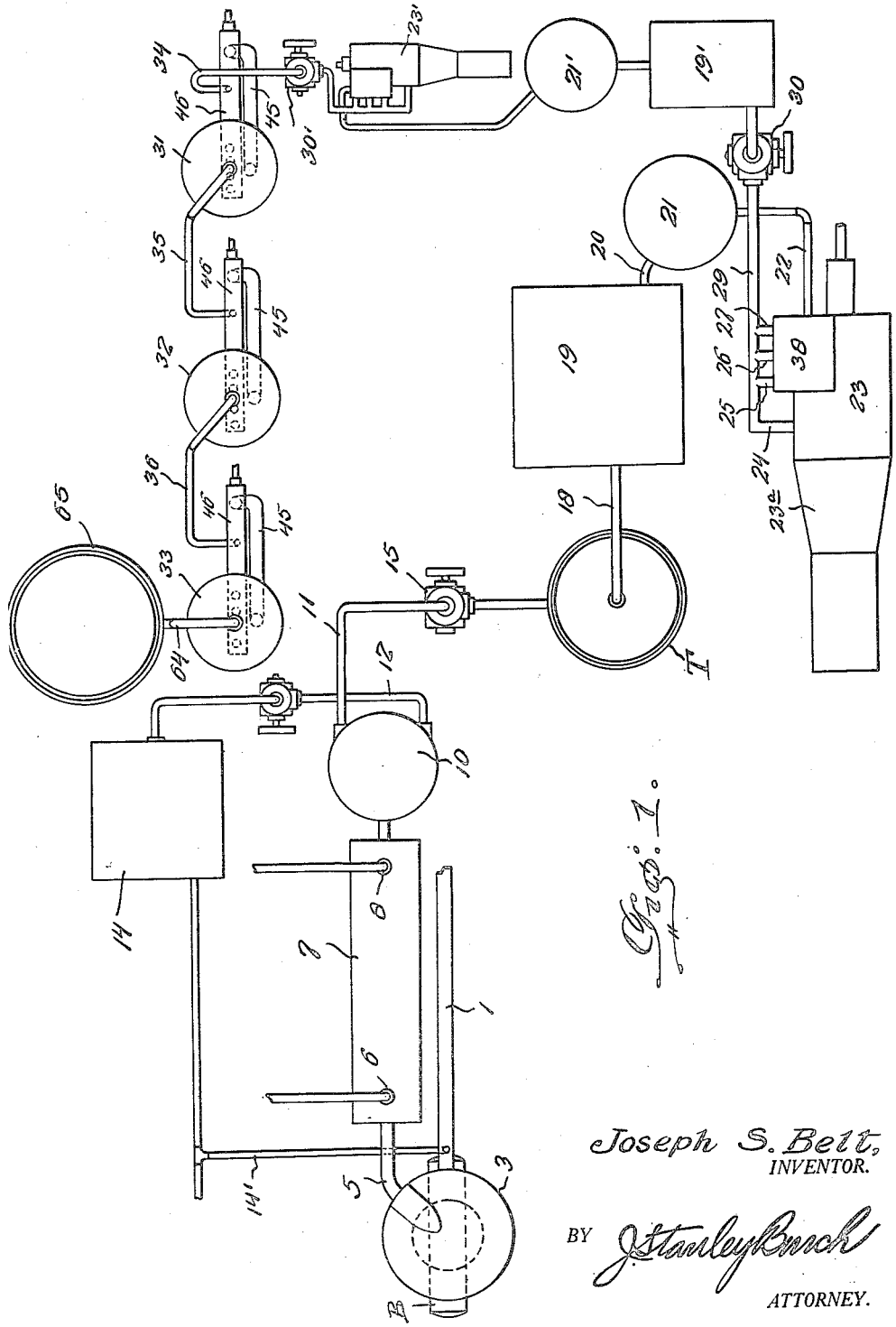

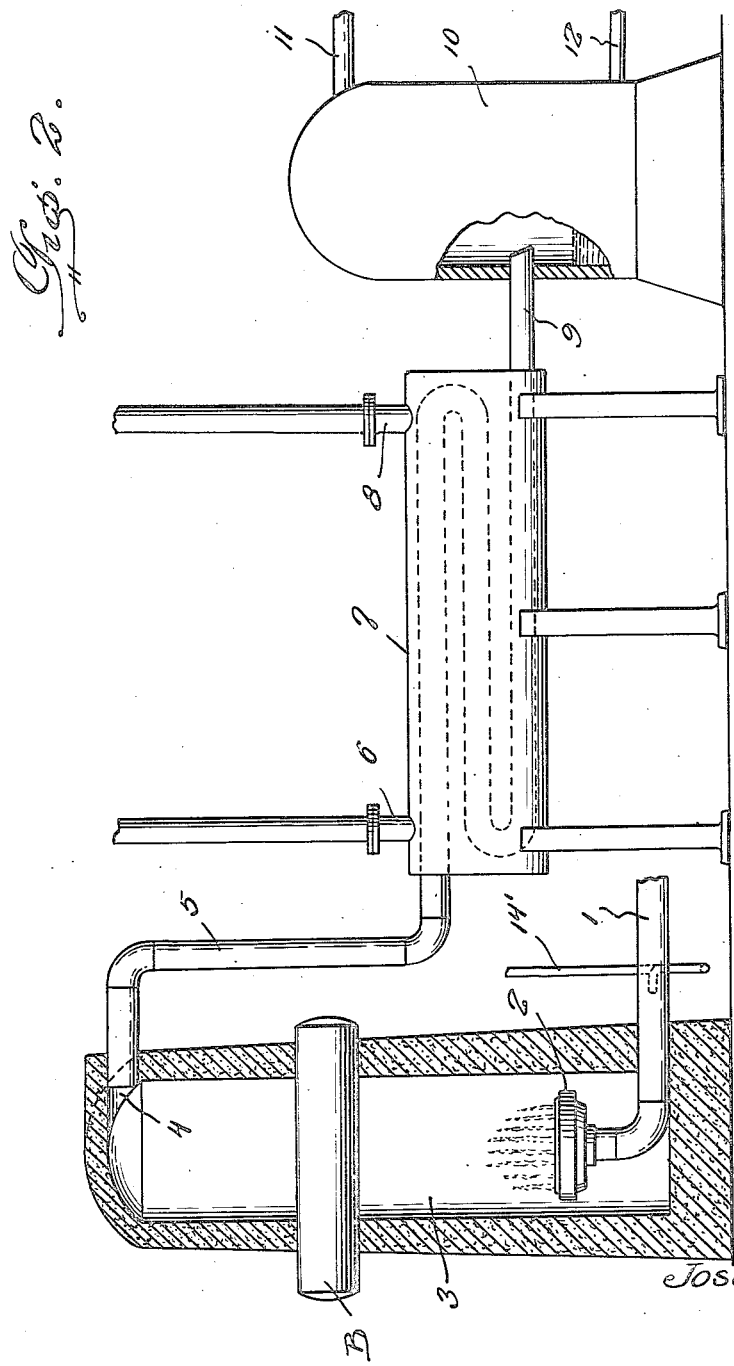

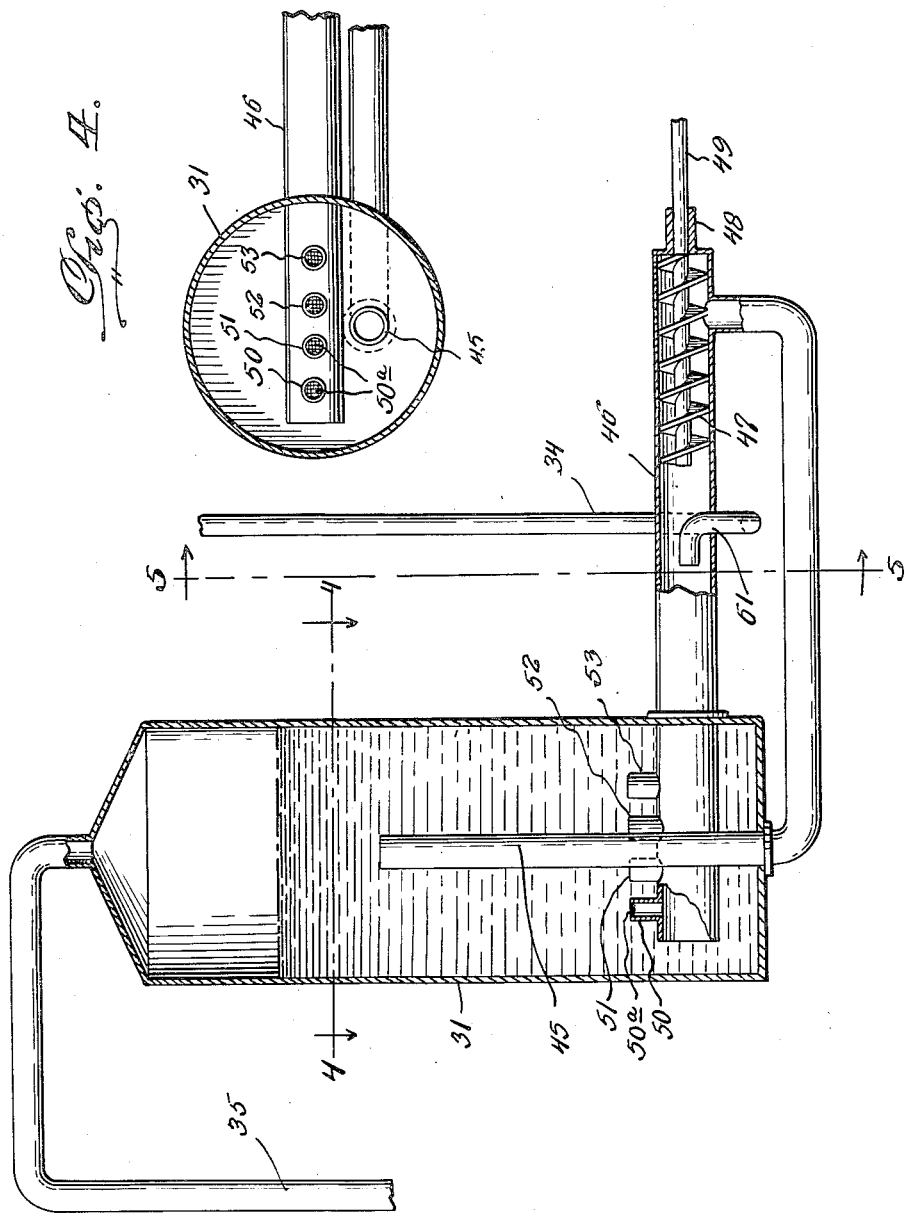

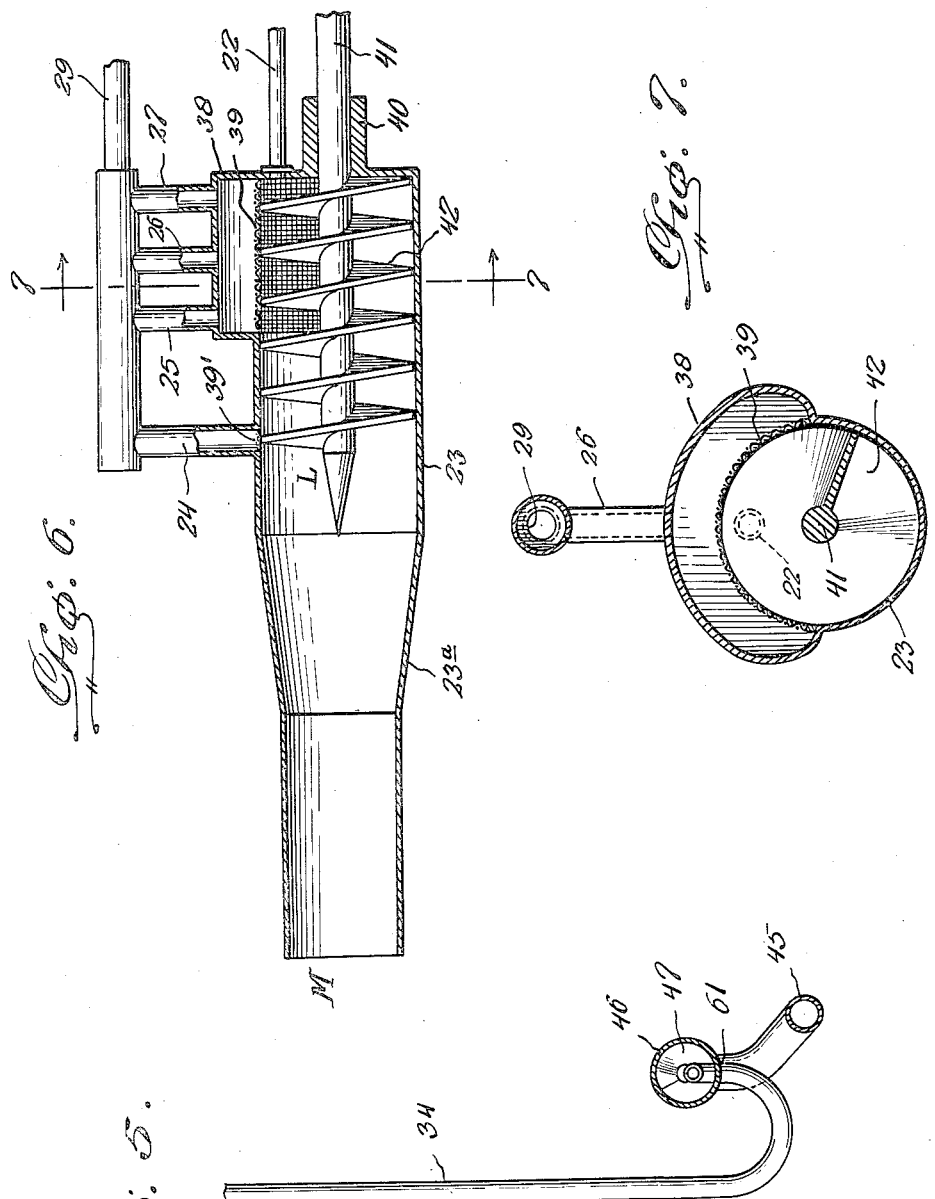

JOSEPH S. BELT, OF AMARILLO, TEXAS

PROCESS OF AND MEANS FOR SEPARATING AND UTILIZING CONSTITUENTS OF NATURAL GAS

Application filed May 21, 1929. Serial No. 364,890.

This invention relates to a process of and means for separating and utilizing constituents of natural gas, and particularly aims to burn natural gas and recover the carbon dioxide occasioned by the burning, to solidify the carbon dioxide into dry ice or solid $CO_2$, and to recover and retain the non-burnable or inert gases originally in the natural gas.

In analogous processes heretofore practiced, natural gas has been liquefied as a whole or without any physical change or transition, and the elements or constituents desired have then been obtained or separated by fractional distillation of the liquids. The results of these prior processes have been more or less unsatisfactory, and in carrying them out it has been necessary to use special care and skill as well as to provide complicated and expensive equipment.

The principal object of the present invention, therefore, is to simplify and improve prior processes and apparatus for separating and utilizing the constituents of natural gas, and to greatly facilitate the separation and utilization thereof with uniform improved results and by means of inexpensive simple equipment requiring little care or skilled attention. I accomplish this object, generally speaking, by first changing the identity of the hydrocarbon compounds in the gas by burning the latter to convert them into carbon dioxide, then solidifying the carbon dioxide to effect a riddance of the hydrocarbon compounds from the original volume resulting from the burned gas. Thus, the residue or isolated tail gases remaining are the inert gases only, which may be readily separated for recovery by liquefication and fractional distillation.

The process is best understood by reference to the accompanying drawings, in which;

Figure 1 is a diagrammatic plan view of the apparatus or equipment for carrying out the process in accordance with the present invention.

Figure 2 is a fragmentary elevation of the burning chamber, condenser and separating tank of the apparatus shown in Figure 1, partly broken away and in section.

Figure 3 is a vertical sectional view of one of the scrubbing towers of the apparatus shown in Figure 1.

Figure 4 is a horizontal section on line 4—4 of Figure 3.

Figure 5 is a vertical section on line 5—5 of Figure 3.

Figure 6 is a vertical sectional view of one of the gas expansion chambers forming part of the apparatus shown in Figure 1; and Figure 7 is a vertical section on line 7—7 of Figure 6.

Referring in detail to the drawings, 3 is a burning chamber which is air-tight, and 1 is a natural-gas fuel line leading into the burning chamber 3, while 2 is a gas burner by which the natural gas conducted into 3 by means of 1 is burned. Nothing will burn without oxygen, and the oxygen is supplied by the air when anything is burned in the open. However, to burn the gas inside the airtight chamber 3, oxygen must be supplied artificially. Therefore, an electrolysis plant 14 is used in conjunction with the process by which water is electrolyzed and changed into its constituent gases of oxygen and hydrogen. The oxygen thus obtained is supplied through pipe 14' into the burning chamber to cause the natural gas to burn. An electrolysis plant is necessary because great quantities of oxygen are necessary.

In the burning of the natural gas with oxygen in the chamber 3, by supplying oxygen artificially, great heat is occasioned, much greater than if the gas were burned in the open air. By using a tube boiler B set in the burning chamber, horizontally above the flame, the heat from the burning natural gas can be utilized to provide steam power to operate the present apparatus or plant.

Upon burning the natural gas, the hydrocarbon constituents of methane and ethane change their identity by breaking up and recombining, thus forming carbon dioxide and water. The inert or non-combustible gases that are present in the natural gas are unaffected other than being highly heated. Therefore, the chamber 3 must be so constructed as to withstand great heat.

The object of supplying oxygen artificially into the air-tight burning chamber is, of course, to keep from burning the gas in the air, for the air is but 21% oxygen and all the rest of the atmosphere is inert gas. So oxygen is used to keep the inert gas of the air, (which is principally nitrogen), from being mixed with the gases after burning the natural gas.

The burned gases, or residue gases after burning the natural gas in the chamber 3, will contain the original inert gases of the natural gas but the hydrocarbons will be displaced by carbon dioxide, ($CO_2$), and water vapor, ($H_2O$). Being highly heated, their tendency is naturally to rise.

The numeral 4 indicates an opening in the burning chamber 3 in which is inserted or connected, the pipe 5 through which the burned gases are drawn off, and 7 is a heat exchanger or condenser which is nothing more than a series of pipes, or a coiled pipe, inside a water jacket into which cold water or liquid can be pumped at 6 circulating over the pipes or coil, and discharging at 8.

The pipe 5 through which the burned gases are drawn off from the burning chamber 3 connects with the interior pipes or coils of the heat exchanger, and 9 is the discharge pipe from the pipes or coil inside the heat exchanged. The burned gases therefore, pass from the burning chamber 3 down through pipe 5, and through the pipes or coil inside the water jacket of the heat exchanger 7, where they are cooled to 80 degrees centigrade or lower. This, of course, is occasioned by the circulation of cold liquid inside the water jacket of heat exhanger 7 which circulates over and around the inside pipes or coil through which the gases pass from 5 through the heat exchanger. After passing through the pipes or coil employed in the heat exchanger, the burned gases pass out through 9 from the interior of the heat exchanger. The cooling of the gases while passing through the heat exchanger cools the water vapor thrown off or occasioned by the burning, so that when the burned gases reach the discharge point or extremity of 9 the water vapor has been condensed by the cooling in the heat exchanger, and is then liquid water.

Pipe 9 has its extremity protruding inside a tank 10, which we may call the separating tank, for, as the discharge through 9 enters the separating tank 10, the condensed water vapor, that has been cooled by passing through the heat exchanger, is then liquid and pours, to the bottom of the separating tank. Thus the water that was originally vapor is separated from the burned gases. The gases rise in the separating tank and pass out through pipe 11, and the water may be drawn off at the bottom through pipe 12.

Pipe 11 connects with a pump 15. The pump 15 therefore draws off the gases and vapors, after burning, from 3 down 5 through 7 into 10. The gases pass from 10 through the pump 15 into a storage tank T.

Thus, the above steps in the process are simply to burn the natural gas by supplying oxygen to burn it in an airtight burning chamber, to transport the volume of gases and vapor that result from the burning through a heat exchanger as a means to cool them and condense the vapors to liquid water which separates itself upon discharge of the volume into 10, and to draw off the burned gases less the condensed water and store them.

The water is saved because it is pure or substantially pure water, and pure water is a big factor in electrolysis of water to decompose water into its constituent gases of oxygen and hydrogen, and much water will have to be electrolized to supply an adequate amount of oxygen for this process. The average good grade of natural gas when so burned and handled will provide approximately $\frac{1}{3}$ of the amount of pure water necessary to electrolyze for the oxygen to burn it. In other words, ordinarily good fuel gas upon burning 1,000 cubic feet will give off enough pure water recoverable in the process step mentioned to yield, upon electrolysis, $\frac{1}{3}$ the required oxygen to burn 1,000 cubic feet of fuel gas. The other $\frac{2}{3}$ of the water required for electrolysis will have to be distilled or obtained by condensing steam to obtain the required purity.

Of course, the tube boiler horizontally arranged across the burning chamber will provide enough steam for condensing water to electrolyze and also provide enough steam power to practically run the entire plant.

Thus far we have burned the natural gas, separated from it the water given off by the burning, and stored the dry burned gases in the gasometer T.

The burning has changed the hydrocarbon compounds to carbon dioxide and water vapor. The water vapor has been condensed and thus separated from the gas. Therefore, instead of the original natural gas we now have in the gasometer T, the carbon dioxide occasioned by the burning, with which is mixed the inert gases originally in the natural gas. Instead of the original natural gas we have all the nitrogen etc., or the inert gases originally in the natural gas, but, instead of the hydrocarbons, we have carbon dioxide.

Just how much carbon dioxide we have now depends of course upon analysis of the natural gas. In as much as the burning qualities of the natural gas are methane and ethane, the yield of carbon dioxide is 1 cubic foot of carbon dioxide for each cubic foot of methane burned and 2 cubic feet of carbon dioxide for each cubic foot of ethane burned. Therefore, methane always being the greatest hydrocarbon by volume, and assuming that the natural gas was originally 72% methane and 18% ethane, we displace the hydrocarbons upon burning 100 cubic feet of natural gas, with 108 cubic feet of carbon dioxide which is given off by the burning. Assuming also, to illustrate further, that this natural gas was 10% insert gases by volume, we now have in the gasometer T, after burning 100 cubic feet of the natural gas, 108 cubic feet of carbon dioxide plus the 10 cubic feet of insert gases originally in the natural gas.

Now from the gasometer T through pipe 18, this volume is conducted into a liquefaction unit. Gases are liquefied by cooling to their critical temperature, or below, and subjecting them to pressure.

Carbon dioxide will liquefy readily at 0° centigrade under 505 pounds pressure per square inch; also at −20° C. at 285.7 pounds; at −30° C. under 207 pounds; at −40° C. under 146 pounds; at −50° C. under 99.20 pounds, and at −56° C. under 75.18 pounds per square inch. But nitrogen, helium, argon, krypton and any inert gases originally in the natural gas and which is now mixed with the carbon dioxide after the burning, will not liquefy at any of these temperatures and pressures. Consequently, in liquefying the carbon dioxide, the inert gases are not liquefied. However, the liquid carbon dioxide will dissolve a considerable quantity of these inert gases. Just how much it will dissolve is an unknown quantity but, upon liquefaction of the carbon dioxide, the liquid carbon dioxide together with the inert gases are pumped off through pipe 20 into a liquid tank 21.

It is long known that liquid carbon dioxide when expanded through a 2 millimeter pipe, and permitted to escape from the pipe into a chamber, the expansion and evaporation of the liquid gas causes a portion of it to freeze to a solid or snow. The lower the temperature employed or used for the liquid carbon dioxide, the greater will be the efficiency of its freezing or conversion to snow upon expansion and evaporation when discharged into a suitable chamber through the 2 millimeter pipe. Therefore it is advisable, for efficiency in producing the solid carbon dioxide to employ a temperature as low as −56° C. as the temperature of the liquid carbon dioxide before expansion. Also, the lower the temperature at which it is liquefied the lesser is the vapor pressure exerted by the liquid gas. Another advantage in using low temperatures is to get the maximum coldness of liquid carbon dioxide exerted upon the inert gases dissolved therein and that, if any, not dissolved but present in the liquid tank with the liquid carbon dioxide so that when the liquid is discharged through the 2 millimeter pipe, inert gases present and dissolved in the liquid escape with the latter. Thus the low temperatures at which the inert gases have reached because of the liquid carbon dioxide lend an added coldness upon escaping into the expansion chamber and lend greater efficiency or a cooling power to the discharging liquid carbon dioxide which causes a greater amount of the carbon dioxide to freeze to a snow or solidify.

Referring to Figures 1, 6 and 7, we will consider the construction of the expansion chamber into which the liquid carbon dioxide is conducted from the liquid tank 21 through a pipe 22. In large plants a number of these 2 millimeter pipes will be necessary, but for the purpose of this detail we refer to only one.

Referring to the expansion chamber in Figures 1, 6 and 7, 23 is the shell or jacket, and 24 an exhaust vent for dry carbon dioxide gas and inert gases. A portion of the liquid carbon dioxide when expanded or discharged through the expansion pipe 22 will evaporate back to dry gas, thus producing the temperatures low enough to freeze or solidify a portion of it. Some of this, together with some inert gases discharged with the liquid will exhaust itself out through vent or exhaust pipe 24. At 25, 26, and 27 are exhaust vents for the gas trap 38 which is fitted over a portion of the shell or jacket of the expansion chamber 23 as illustrated in Figure 6. The shell or jacket of expansion chamber 23 is cut away under gas trap 38 and the portion cut away is replaced by a closely woven screen 39 with heavy canvas plied over and upon the screen. The dry carbon dioxide occasioned by evaporation of the liquid carbon dioxide, together with the inert gases, pass up through this screen and canvas which acts as a filter to keep the snow or solid carbon dioxde from blowing out and also to regulate the expansion and prevent too rapid a discharge of gases from the expansion chamber. Were it not for this filtering feature the escape of gas would be so rapid that little of the gas would be frozen to a solid. The same means are employed at 39′ in the lower extremity of vent 24. A screen is not necessarily essential, as two or more plies of 10 ounce canvas between metal grating or perforated metal sheets will do as well. At 40 is a bearing in which rotates the shaft 41 of the auger conveyor 42. The conveyor 42 is so rotated that as the snow or solid carbon dioxide accumulates within the expansion chamber 23, it is carried forward and acumulates in front of the auger conveyor at L, being pushed steadily forward. The proportions of the jacket of expansion chamber 23 are diminished as at 23a forward of the conveyor auger 42 so that the accumulating bulk of solid carbon dioxide pushed constantly forward by auger 42 must pass through a smaller orifice or space before emerging at the extremity of chamber 23 at M. This necessarily causes it to pack and be firmly compressed as it is forced forward and out at M. Being protruded as a continuing compressed solid, it may be cut off in any desired lengths as it is protruded at M.

By producing the solid carbon dioxide in the process as described, we have eliminated from the burned gases, most of the carbon dioxide.

The carbon dioxide that evaporates back to dry gas from the liquid without solidifying, together with the accompanying inert gases, as before stated, exhaust through vents 24, 25, 26, 27 after entering the trap or chamber 38 from which they are drawn off through pipe 29 by means of a pump 30 to which pipe 29 is connected. This volume of carbon dioxide gas and inert gases may then be conducted into an auxiliary or secondary liquefaction unit 19' and tank 21' and re-expanded into an auxiliary or secondary expansion chamber 23' in identically the same manner as before. However, the volume being greatly reduced by the first operation, the second operation is on a much smaller scale. Upon this second operation, practically all of the carbon dioxide has been converted to a solid and obtained in the form popularly known as dry ice. Therefore, with this done, the inert gases remain with but a very slight amount of carbon dioxide.

The next step is to free the inert gases of any remaining carbon dioxide. The object of this is to isolate the inert gases free of carbon dioxide so that any helium, argon or other rare and valuable gases that were originally in the natural gas may be obtained by the well known method of liquefaction and fractional distillation. The necessity of ridding the inert gases of all remaining carbon dioxide, if any, is to prevent its freezing and clogging of equipment employed in liquefaction and fractional distillation of the inert gases. To dispose of any remaining carbon dioxide that may yet be present in more or less small quantities with the inert gases, the inert gases are conducted from pump 30' through pipe 34 into scrubbing tower 31, then through pipe 35 into scrubbing tower 32, then through pipe 36 into scrubbing tower 33, and then through pipe 64 to a storage tank or gasometer 65.

From the pump 30' (Figure 1) the inert gases pass through pipe 34 to scrubbing tower 31. Pipe 34 connects with pipe 46 underneath at 61 where the gases enter pipe 46. This tower 31 is filled with lime water or milk of lime within a few feet of the top and well above the height of pipe 45 which is a vertical pipe within the scrubbing tower, elbowed at the bottom, extending through and out from the tower with another elbow and connecting to pipe 46 as shown (Figure 3). At 47 is an auger that rotates inside pipe 46, and 48 is the bearing, and 49 the auger shaft of 47 to which the power is applied to rotate the latter. The lime water in the tower 44 passes downward through pipe 45, then laterally and up into pipe 46 and is circulated forward by auger 47 which by rotating keeps a constant circulation of the liquid which discharges from pipe 46 inside the tower, which pipe 46 enters as shown. The inert gases entering pipe 46 through pipe 34 rise to the upper interior of pipe 46 and are carried along in bubble form with the forward movement of the liquid toward and into the tower. At 50, 51, 52, 53 are discharge vents inside the tower and opening upwardly from pipe 46. The upper extremity of each of these vents is covered with a screen or fine mesh 50a. The gas bubbles traveling along under the upper interior of pipe 46 escape upward upon reaching these vents and passes up through the screens over the vents, 50, 51, 52, 53, being thus atomized. The extremity of pipe 46 within the tower is open, permitting free discharge of the circulating liquid within the tower. Being thus atomized the gases come in closer contact with the lime water, being more efficiently washed or scrubbed in this manner than by passing the gas through the liquid in large bubbles. The action of the lime water is to cause the lime to combine with the carbon dioxide which forms calcium carbonate. Thus the inert gases are washed clean by the lime combining with the carbon dioxide and precipitating it as solid calcium carbonate or lime stone. The same operation is repeated in the similar towers 32 and 33, and the inert gases are then free of carbon dioxide and may be processed by liquefaction and fractional distillation for recovery of helium, argon, krypton or such rare and valuable gases composing a part of its volume.

From the above description, it will be seen that the present invention provides a simple and efficient process and means for separating constituents of natural gas, and for utilizing the hydrocarbon compounds thereof to produce solid carbon dioxide or dry ice which may be used to advantage for many cooling and refrigerating purposes. It will also be seen that the carbon dioxide is used to advantage and effectively eliminated for permitting recovery and separation of the inert gases, while the latter are utilized to assist in solidifying and therefore eliminating the carbon dioxide.

Modifications may obviously be made in details of construction, arrangement and proceedure without departing from the spirit of the invention as claimed.

What I claim is:—

1. In the process of separating and utilizing constituents of natural gas, the improved steps which consists in first burning the natural gas with oxygen in an air-tight chamber to produce flue gases in which the hydrocarbon compounds in the natural gas have been converted to carbon dioxide and water vapor, then condensing and removing the water vapor from the flue gases, and then solidifying and removing the carbon dioxide from the flue gases to recover the inert gases therefrom.

2. In the process of separating and utilizing constituents of natural gas, the improved steps which consists in first burning the natural gas with oxygen in an air-tight chamber to produce flue gases in which the hydrocarbon compounds in the natural gas have been converted to carbon dioxide and water vapor, then condensing the water vapor and separating it from the remaining gases, and then solidifying the carbon dioxide to remove the carbon dioxide from and recover the inert gases.

3. In the process of separating and utilizing constituents of natural gas, the improved steps which consists in first burning the natural gas with oxygen in an air-tight chamber to produce flue gases in which the hydrocarbon compounds in the natural gases have been converted to carbon dioxide and water vapor, then condensing and removing the water vapor from the flue gases, and then utilizing the inert gases to assist in solidifying the carbon dioxide, so that most of the carbon dioxide is converted into dry ice and removed from the inert gases.

4. In the process of separating and utilizing constituents of natural gas, the improved steps which consists in first burning the natural gas with oxygen in an air-tight chamber to produce flue gases in which the hydrocarbon compounds in the natural gas have been converted to carbon dioxide and water vapor, then condensing the water vapor and separating it from the carbon dioxide and inert gases, then liquefying the carbon dioxide, and then expanding the liquefied carbon dioxide in the presence of the inert gases to convert most of the former into dry ice and remove it from the inert gases.

5. In the process of separating and utilizing constituents of natural gas, the improved steps which consists in first burning the natural gas with oxygen in an air-tight chamber to produce flue gases in which the hydrocarbon compounds in the natural gas have been converted to carbon dioxide and water vapor, then condensing the water vapor and separating it from the carbon dioxide and inert gases, then liquefying the carbon dioxide, then expanding the liquefied carbon dioxide in the presence of the inert gases to convert most of the former into dry ice and remove it from the inert gases, then removing any remaining trace of the carbon dioxide from the inert gases, and then extracting the desired gas from said inert gases.

6. Apparatus for separating and utilizing constituents of natural gas comprising an air-tight chamber, means for supplying natural gas and pure oxygen to and burning the same in said chamber, a condenser, means to conduct the burned gas from said chamber through the condenser, a separating tank connected to said conducting means to receive the condensed water vapor and gases from the condenser, said separating tank having separate outlets for the condensed water vapor and the gases, means for liquefying the carbon dioxide in the gases passing from the separating tank, means for expanding and solidifying the liquefied carbon dioxide to remove the latter from inert gases, and means to receive and store the inert gases for subsequent extraction of the desired gas therefrom.

7. In the process of separating and utilizing constituents of natural gas, the improved steps which consist in first burning the natural gas with oxygen in an air-tight chamber to produce flue gases in which the hydrocarbon compounds in the natural gas have been converted to carbon dioxide and water vapor, then condensing and removing the water vapor from the flue gases, and then removing the carbon dioxide from the flue gases by a step of separation including lowering the temperature of the gases below the boiling point of carbon dioxide under the existing pressure, to recover the inert gases.

In testimony whereof I affix my signature.

JOSEPH S. BELT.